(12) United States Patent
Chen et al.

(10) Patent No.: US 8,626,677 B2
(45) Date of Patent: Jan. 7, 2014

(54) TRAINING SVMS WITH PARALLELIZED STOCHASTIC GRADIENT DESCENT

(75) Inventors: Weizhu Chen, Beijing (CN); Gang Wang, Beijing (CN); Zheng Chen, Beijing (CN)

(73) Assignee: Microsoft Corporation, Redmond, WA (US)

(*) Notice: Subject to any disclaimer, the term of this patent is extended or adjusted under 35 U.S.C. 154(b) by 710 days.

(21) Appl. No.: 12/790,532

(22) Filed: May 28, 2010

(65) Prior Publication Data

US 2011/0295774 A1 Dec. 1, 2011

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| 2003/0158830 A1 | 8/2003 | Kowalczyk et al. |
| 2005/0049990 A1 | 3/2005 | Milenova et al. |
| 2006/0112026 A1 | 5/2006 | Graf et al. |
| 2007/0094170 A1 | 4/2007 | Graf et al. |

OTHER PUBLICATIONS

Zhu et al ("P-packSVM: Parallel Primal grAdient desCent Kernel SVM" ICDM Dec. 2009).*

Graf et al ("Parallel Support Vector Machines: The cascade svm" 2005).*

Amdahl, "Validity of the single processor approach to achieving large scale computing capabilities", retrieved on Apr. 17, 2010 at <<http://userweb.cs.utexas.edu/~dburger/cs395t/papers/5_amdahl.pdf>>, ACM, AFIPS Joint Computer Conferences, 1967, pp. 483-485.

Cao, Keerthi, Ong, Uvaraj, Fu, Lee, Zhang, "Parallel Sequential Minimal Optimization for the Training of Support Vector Machines", retrieved on Apr. 17, 2010 at <<http://guppy.mpe.nus.edu.sg/~mpeongcj/html/%20of%20papers/parallel_SMO_IEEE.pdf>>, IEEE Transactions on Neural Networks, vol. 17, No. 4, Jul. 2006, pp. 1039-1049.

Chang, Lin, "LIBSVM: a Library for Support Vector Machines", retrieved on Apr. 17, 2010 at <<http://www.csie.ntu.edu.tw/~cjlin/libsvm>>, National Taiwan University Technical Report, Computer Science and Information Engineering, 2001-2004, pp. 1-30. (software available at http://www.csie.ntu.edu.tw/~cjlin/libsvm).

Chang, Zhu, Wang, Bai, "PSVM: Parallelizing Support Vector Machines on Distributed Computers", retrieved on Apr. 17, 2010 at <<http://books.nips.cc/papers/files/nips20/NIPS2007_0435.pdf>>, MIT Press, Advances in Neural Information Processing Systems (NIPS), 2007, pp. 257-264.

Collobert, Bengio, Bengio, "A Parallel Mixture of SVMs for Very Large Scale Problems", retrieved on Apr. 17, 2010 at <<http://ronan.collobert.com/pub/matos/2002_mixtures_nips.pdf>>, MIT Press, Neural Computation, vol. 14, No. 5, 2002, pp. 1105-1114.

(Continued)

*Primary Examiner* — Lut Wong
(74) *Attorney, Agent, or Firm* — Lee & Hayes, PLLC (57) ABSTRACT

Techniques for training a non-linear support vector machine utilizing a stochastic gradient descent algorithm are provided. The computations of the stochastic gradient descent algorithm are parallelized via a number of processors. Calculations of the stochastic gradient descent algorithm on a particular processor may be combined according to a packing strategy before communicating the results of the calculations with the other processors.

18 Claims, 6 Drawing Sheets

(56) References Cited

OTHER PUBLICATIONS

Fan, "LIBSVM Data: Classification, Regression, and Multilabel", retrieved on Apr. 19, 2010 at <<http://www.csie.ntu.edu.tw/~cjlin/libsvmtools/datasets/>>, National Taiwan University, Nov. 28, 2006, pp. 1-3.

Ferris, Munson, "Interior-Point Methods for Massive Support Vector Machines", retrieved on Apr. 17, 2010 at <<http://pages.cs.wisc.edu/~ferris/papers/siopt-svm.pdf>>, Society for Industrial and Applied Mathematics, SIAM Journal on Optimization, vol. 13, No. 3, 2002, pp. 783-804.

Fine, Scheinberg, "Efficient SVM Training Using Low-Rank Kernel Representations", retrieved on Apr. 17, 2010 at <<http://www.google.co.in/url?sa=t&source=web&ct=res&cd=1&ved=0CAYQFjAA&url=http%3A%2F%2Fciteseerx.ist.psu.edu%2Fviewdoc%2Fdownload%3Fdoi%3D10.1.1.72.2049%26rep%3Drep1%26type%3Dpdf&rct=j&q=Efficient+SVM+Training+Using+Low-Rank+Kernel+Representations&ei=ynnJS7WiAp680gShvJHGBA&usg=AFQjCNE5YcG2Vv_yeacTrJvnS5A22y8TgQ>>, JMLR.org, Journal of Machine Learning Research, vol. 2, 2001, pp. 243-264.

Hush, Kelly, Scovel, Steinwart, "QP Algorithms with Guaranteed Accuracy and Run Time for Support Vector Machines", retrieved on Apr. 17, 2010 at <<http://www.google.co.in/url?sa=t&source=web&ct=res&cd=1&ved=0CAYQFjAA&url=http%3A%2F%2Fciteseerx.ist.psu.edu%2Fviewdoc%2Fdownload%3Fdoi%3D10.1.1.61.6884%26rep%3Drep1%26type%3Dpdf&rct=j&q=&ei=43rJS4rmG4Hw0wSO06XABA&usg=AFQjCNFu4t5ly6a6lvj_kTgqkxYXXzlKZA>>, JMLR.org, Journal of Machine Learning Research, vol. 7, 2006, pp. 733-769.

Joachims, "Learning to Classify Text Using Support Vector Machines (Abstract)", retrieved on Apr. 22, 2010 at <<http://www.cs.cornell.edu/People/tj/svmtcatbook/>>, Kluwer Academic Publisher, 2002, pp. 1-4.

Joachims, "Making Large-Scale SVM Learning Practical", retrieved on Apr. 17, 2010 at <<http://citeseerx.ist.psu.edu/viewdoc/download;jsessionid=A0337C0CDCE440FEAF9F16063CDE0182?doi=10.1.1.52.1136&rep=rep1&type=pdf>>, University of Dortmund, LS 8-Report 24, Jun. 1998, pp. 41-56.

Joachims, "Optimizing Search Engines using Clickthrough Data", retrieved on Apr. 17, 2010 at <<http://www.cs.cornell.edu/People/tj/publications/joachims_02c.pdf>>, ACM, Conference on Knowledge Discovery and Data Mining (SIGKDD), 2002, pp. 133-142.

Joachims, "Training Linear SVMs in Linear Time", retrieved on Apr. 17, 2010 at <<http://www.cs.cornell.edu/People/tj/publications/joachims_06a.pdf>>, ACM, Conference on Knowledge Discovery and Data Mining (SIGKDD), Aug. 20, 2006, pp. 217-226.

Kakade, Shalev-Shwartz, "Mind the Duality Gap: Logarithmic regret algorithms for online optimization", retrieved on Apr. 17, 2010 at <<http://citeseerx.ist.psu.edu/viewdoc/download;jsessionid=74690A8BD8C986458F39432E2014BB73?doi=10.1.1.142.2&rep=rep1&type=pdf>>, MIT Press, Advances in Neural Information Processing Systems (NIPS), Dec. 9, 2008, pp. 1457-1464.

Kivinen, Smola, Williamson, "Online Learning with Kernels", retrieved on Apr. 17, 2010 at <<http://users.cecs.anu.edu.au/~williams/papers/P149.pdf>>, MIT Press, Advances in Neural Information Processing Systems (NIPS), vol. 14, 2002, pp. 785-792.

Lewis, Yang, Rose, Li, "RCV1: A New Benchmark Collection for Text Categorization Research", retrieved on Apr. 17, 2010 at <<http://jmlr.csail.mit.edu/papers/volume5/lewis04a/lewis04a.pdf>>, JMLR.org, Journal of Machine Learning Research, vol. 5, 2004, pp. 361-397.

Loosli, Canu, Bottou, "Training Invariant Support Vector Machines using Selective Sampling", retrieved on Apr. 17, 2010 at <<http://upload.pobrun.com/40/uploads/files/publications/techreport_lasvm.pdf>>, MIT Press, Large Scale Kernel Machines, 2007, pp. 301-320.

Manning, Raghavan, Schutze, "An Introduction to Information Retrieval", retrieved on Apr. 17, 2010 at <<http://nlp.stanford.edu/IR-book/pdf/00front.pdf>>, Cambridge University Press, 2009, pp. 1-37.

Mehrotra, "On the Implementation of a Primal-Dual Interior Point Method", retrieved on Apr. 19, 2010 at <<http://scitation.aip.org/getabs/servlet/GetabsServlet?prog=normal&id=SJOPE800000200000400057500000001&idtype=cvips&gifs=yes&ref=no>>, SIAM Journal on Optimization, vol. 2, No. 4, Nov. 1992, pp. 575-601.

"MPI Documents", retrieved on Apr. 19, 2010 at <<http://www.mpi-forum.org/docs/>>, 2010, pp. 1-2.

Platt, "Fast Training of Support Vector Machines using Sequential Minimal Optimization", retrieved on Apr. 17, 2010 at <<http://209.85.129.132/search?q=cache:5JChx7KMQqIJ:research.microsoft.com/en-us/um/people/jplatt/smo-book.ps.gz+Fast+Training+of+Support+Vector+Machines+using+Sequential+Minimal&cd=1&hl=en&ct=clnk&gl=in&client=firefox-a>>, MIT Press, 1999, pp. 185-208.

Shalev-Shwartz, "Online Learning: Theory, Algorithms, and Applications", retrieved on Apr. 17, 2010 at <<Shalev-Shwartz, Online Learning: Theory, Algorithms, and Applications>>, Hebrew University, Doctoral Thesis, Jul. 2007, pp. 1-162.

Shalev-Shwartz, Singer, Srebro, "Pegasos: Primal Estimated sub-GrAdient SOlver for SVM", retrieved on Apr. 17, 2010 at <<http://ttic.uchicago.edu/~shai/papers/ShalevSiSr07.pdf>>, ACM, Proceedings of Conference on Machine Learning (ICML), vol. 227, 2007, pp. 807-814.

Shalev-Shwartz, Srebro, "SVM Optimization: Inverse Dependence on Training Set Size", retrieved on Apr. 17, 2010 at <<http://icml2008.cs.helsinki.fi/papers/266.pdf>>, ACM, Proceedings of Conference on Machine Learning (ICML), vol. 307, 2008, pp. 928-935.

Woodsend, Gondzio, "Parallel support vector machine training with nonlinear kernels", retrieved on Apr. 17, 2010 at <<http://bigml.wikispaces.com/file/view/Woodsend.pdf>>, Technical Report MS-07-007, School of Mathematics, The University of Edinburgh, Nov. 23, 2007, pp. 1-2.

Zanghirati, Zanni, "A parallel solver for large quadratic programs in training support vector machines", retrieved on Apr. 17, 2010 at <<http://dm.unife.it/gpdt/zz-parco2003.pdf>>, Elsevier Science Publishers Amsterdam, Parallel Computing, vol. 29, No. 4, Apr. 2003, pp. 535-551.

Zhang, "Solving Large Scale Linear Prediction Problems Using Stochastic Gradient Descent Algorithms", retrieved on Apr. 17, 2010 at <<http://delivery.acm.org/10.1145/1020000/1015332/p12-zhang.pdf?key1=1015332&key2=8793561721&coll=GUIDE&dl=GUIDE&CFID=84854457&CFTOKEN=19659702>>, ACM, Proceedings of Conference on Machine Learning (ICML), vol. 69, 2004, pp. 116-124.

\* cited by examiner

TRAINING SVMS WITH PARALLELIZED STOCHASTIC GRADIENT DESCENT

BACKGROUND

Support vector machines (SVMs) are a type of machine learning method that can be used for classification, regression analysis, and ranking For example, based on a set of training data samples that are each associated with one category or another, SVMs may be used to predict which category a new data sample will be associated with. The data samples may be expressed as an ordered pair including a vector that indicates features of a particular data sample and a classifier that indicates the category of the particular data sample. In a particular example, the set of training data $\Psi$ may be given by:

$$\Psi = \{(x_i, y_i) | x_i \in \mathbb{R}^n, y_i \in \{-1, 1\}\}_{i=1}^m \quad (1)$$

where $x_i$ is a feature vector for a particular sample, $y_i$ is the classifier of the particular sample, m is the number of samples in a set of training data, and $\mathbb{R}$ is the set of real numbers.

Continuing with the classification example, SVMs construct a hyperplane having one or more dimensions that may separate data samples into two categories. An optimal solution given by the SVM is the hyperplane that provides the largest separation between vectors of the two categories. The vectors that limit the amount of separation between the two categories are often referred to as the "support vectors."

In some instances, linear hyperplanes separate data samples in the two categories. In other instances, non-linear hyperplanes separate the data samples in the two categories. When non-linear hyperplanes separate the data samples, SVMs may utilize a kernel function to map the data into a different space having higher dimensions, such as the Reproducing Kernel Hilbert Space for a Mercer kernel $\mathcal{K}$. In this way, a linear hyperplane can be used to separate data that would otherwise be separated by a non-linear curve with complex boundaries.

The primal form of the objective function to be solved by non-linear SVMs is given by:

$$f(w) = \frac{\sigma}{2} \|w\|_2^2 + \frac{1}{m} \sum_{i=1}^m \max\{0, 1 - y_i \langle w, \phi(x_i) \rangle\} \quad (2)$$

where w is a predictor vector that is normal to the hyperplane that provides maximum separation between two classes. In addition, $\sigma$ is a regularizer weight of the regularization function $$\frac{\sigma}{2} \|w\|_2^2$$

that is used to make the objective function more regular or smooth. Further, the term $$\frac{1}{m} \sum_{i=1}^m \max\{0, 1 - y_i \langle w, \phi(x_i) \rangle\}$$

may be referred herein to as the loss function for the SVM primal objective function.

Training non-linear support vector machines can be resource intensive and time consuming. Many SVM training algorithms optimize a dual form of the objective function using Lagrangian multipliers. However, in some cases, these algorithms may sacrifice accuracy for speed. In addition, attempts to reduce the amount of time to train non-linear SVMs by parallelizing computations among a number of processors to optimize the dual form of the objective function have provided marginal results.

SUMMARY

This disclosure describes training non-linear SVMs using parallelized stochastic gradient descent algorithms. The stochastic gradient descent algorithms train non-linear SVMs by optimizing the primal SVM objective function. In addition, the computations of the stochastic gradient descent algorithms may be parallelized on a number of processors. Calculations of the stochastic gradient descent algorithm on a particular processor may be combined according to a packing strategy before communicating the results of the calculations with the other processors.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to the accompanying Figures. In the Figures, the left-most digit(s) of a reference number identifies the Figure in which the reference number first appears. The use of the same reference numbers in different Figures indicates similar or identical items or features.

DETAILED DESCRIPTION

Figure 1:
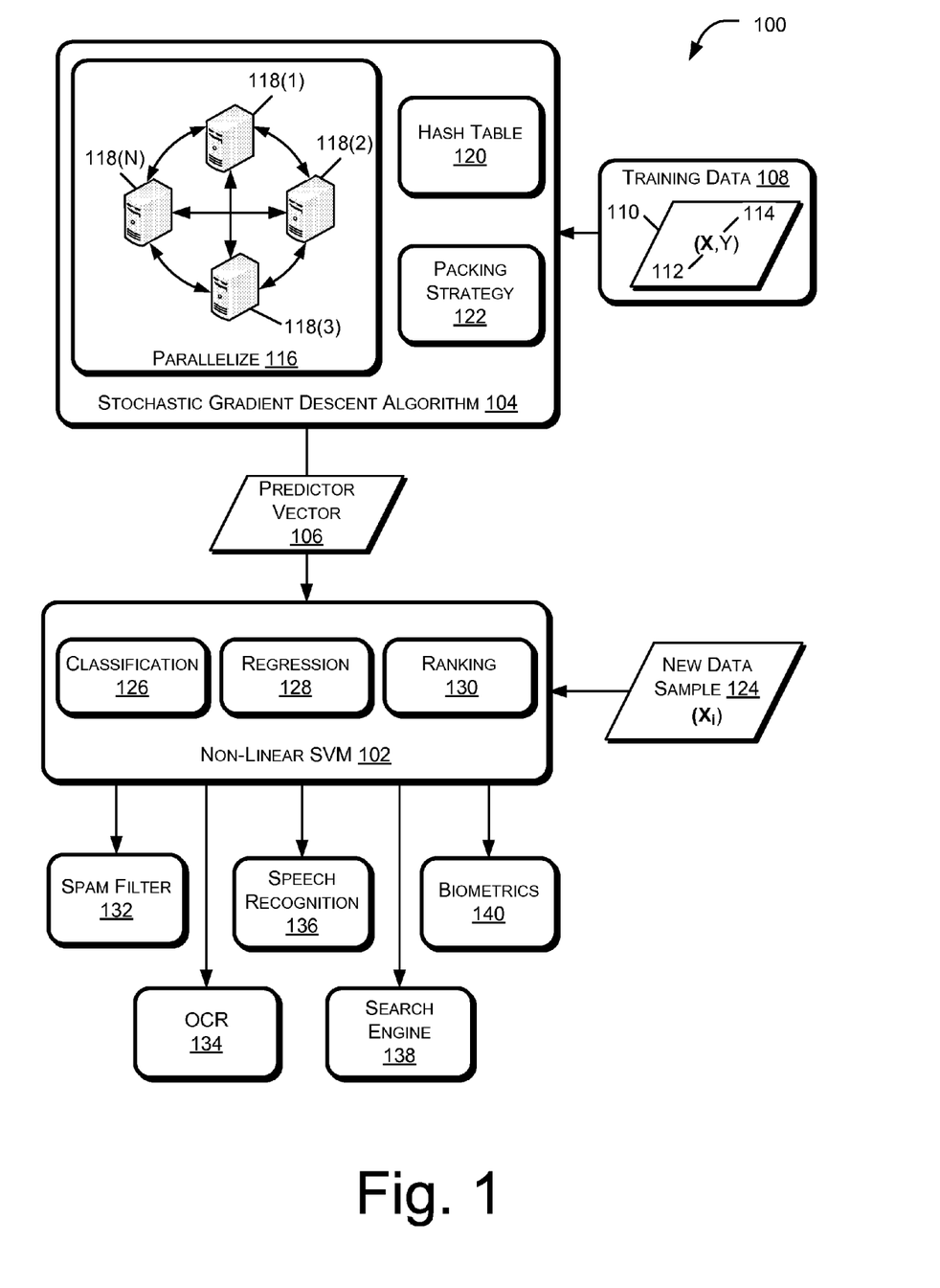
FIG. 1 is a block diagram illustrating training of a support vector machine using a parallelized stochastic gradient descent algorithm.

FIG. 1 illustrates an example framework 100 for training a non-linear support vector machine (SVM) 102 using a parallelized stochastic gradient descent algorithm 104. The non-linear SVM 102 may also be referred to in this disclosure as a kernel SVM. The stochastic gradient descent algorithm 104 may be used to fit parameters of the primal objective function of the non-linear SVM 102. In particular, the stochastic gradient descent algorithm 104 may determine a predictor vector 106 for the primal objective function of the non-linear SVM 102.

The non-linear SVM 102 may be implemented using a set of training data 108 that includes a plurality of samples 110. Each sample 110 of the set of training data 108 may include an ordered key-value pair having a feature vector 112 as a key and a corresponding value 114. The stochastic gradient descent algorithm 104 may be executed over a number of iterations utilizing a respective training data sample 110 for each iteration to determine the predictor vector 106 for the primal objective function of the non-linear SVM 102. The number of iterations may represent a particular number of iterations that allow the stochastic gradient descent algorithm 104 to converge. In some cases, the number of iterations may be predetermined.

The computations of the stochastic gradient descent algorithm 104 may implement a parallelization method 116 on a number of processors 118(1) . . . 118(N). For example, each of a plurality of processors 118 may perform a different set of calculations to execute the stochastic gradient descent algorithm 104. The processors 118 may communicate with each other to share the results of their respective computations and derive a final result. The processors 118 may reside within a single computing device or the processors 118 may reside on a number of different computing devices. Although four processors 118 are shown in FIG. 1, any number of processors may be utilized to parallelize computations of the stochastic gradient descent algorithm 104.

In some instances, the parallelization method 116 may utilize a hash table 120, which may also be referred to herein as a "master hash table." The hash table 120 may be generated by applying a hash function to a number of data samples from the set of training data 108. In some cases, the hash function may map feature vectors of the samples of training data 108 with their respective classifier value. The hash table 120 may be used by the stochastic gradient descent algorithm 104 to calculate the predictor vector 106 for the non-linear SVM 102. In a particular implementation, a portion of the hash table 120 is associated with each respective processor 118, such that each of the processors 118 utilizes a particular portion of the hash table 120 to perform calculations of the stochastic gradient descent algorithm 104. The portion of the hash table 120 associated with each particular processor 118 may be referred to herein as a "distributed hash table" or a "local distributed hash table."

In addition, a packing strategy 122 may be implemented to reduce the frequency of communications between the processors 118 utilized to execute the stochastic gradient descent algorithm 104. For example, in some cases, each processor 118 may perform calculations for each iteration of the stochastic gradient descent algorithm 104 and communicate results of one or more of the calculations to at least one other processor 118. The packing strategy 122 may package results of a plurality of the calculations related to execution of the stochastic gradient descent algorithm 104 into a single communication that is then transmitted to one or more of the other processors 118, rather than the processors 118 communicating with each other after performing a certain calculation.

After training the non-linear SVM 102 according to the stochastic gradient descent algorithm 104, a new data sample 124 having a particular feature set, $X_j$, may be provided to the non-linear SVM 102. The non-linear SVM 102 may be used to characterize the new data sample 124 via a classification module 126, a regression module 128, or a ranking module 130. Once the new data sample 124 has been characterized, the new data sample 124 may be used in a variety of applications, such as a spam filter application 132, an optical character recognition (OCR) application 134, a speech recognition application 136, a search engine application 138, a biometrics application 140, a combination thereof, or any of various other types of applications (not shown).

By utilizing a parallelized stochastic gradient descent algorithm 104 to optimize the primal objective function of the non-linear SVM 102 and by utilizing a packing strategy to reduce the frequency of inter-processor communication, the time to train the non-linear SVM 102 may be reduced. In addition, utilizing the parallelized stochastic gradient descent algorithm 104 with the inter-processor communication packing strategy to train the non-linear SVM 102 may improve the accuracy of the SVM 102 and decrease the computing resources utilized to train the non-linear SVM 102.

Figure 2:
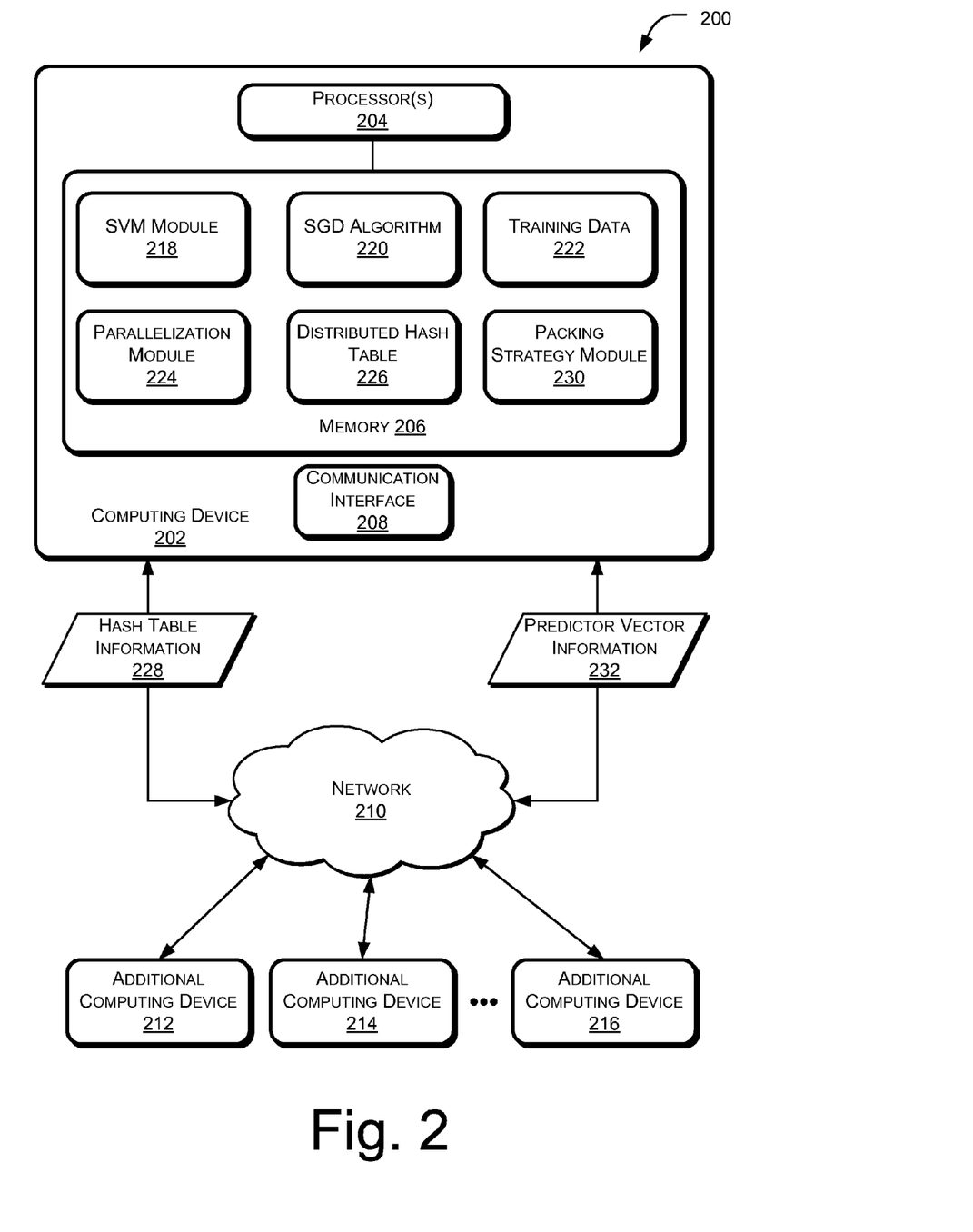
FIG. 2 illustrates a system to train support vector machines using a stochastic gradient descent algorithm.

FIG. 2 illustrates a system 200 to train support vector machines using a stochastic gradient descent algorithm. The system 200 includes a computing device 202. The computing device 202 may be a server computer, a mainframe computer, a personal computer, or other suitable computing device. The computing device 202 includes one or more processors 204 and memory 206. The memory 206 is an example of computer-readable storage media and may include volatile memory, nonvolatile memory, removable memory, non-removable memory, or a combination thereof. For example, the memory 206 may include, but is not limited to, RAM, ROM, EEPROM, flash memory, one or more hard disks, solid state drives, floppy disks, optical memory (e.g., CD, DVD), or other non-transient memory technologies.

The computing device 202 also includes one or more communication interfaces 208 to facilitate wired and/or wireless communications via a network 210 with one or more additional computing devices 212-216. The network 210 may be representative of any one or combination of multiple different types of wired and wireless networks, such as the Internet, cable networks, satellite networks, wide area wireless communication networks, wireless local area networks, and public switched telephone networks (PSTN). In some cases, the additional computing devices 212-216 may include components similar to those of the computing device 202.

The memory 206 includes a support vector machine (SVM) module 218. The SVM module 218 may characterize data samples received by the computing device 202. For example, the SVM module 218 may classify a data sample as belonging to one of two classes, such as classifying an email as spam or not spam. In other examples, the SVM module 218 may rank a new data sample with respect to a set of samples and/or predict a value based on the new data sample by using a regression analysis. The SVM module 218 may utilize a linear SVM or a non-linear SVM to characterize data samples.

The memory 206 also includes a stochastic gradient descent (SGD) algorithm 220. The SGD algorithm 220 may train support vector machines using training data 222. The training data 222 may include a number of training data samples with known values. For example, to train a classification SVM, the training data 222 may include training data samples that include a feature vector x and a classifier value y. In a particular illustration, the feature vector x may indicate a number of features of an email, such as when the email is sent, the sender of the email, length of the email, etc. and the classifier value y may indicate whether the email is spam or not spam based on the set of features.

In an illustrative implementation, the SGD algorithm 220 may determine a predictor vector for a non-linear SVM based on a number of samples from the training data 222. In particular, the SGD algorithm 220 may select a particular training data sample, determine the gradient of the primal SVM objective function for the particular training data sample, and update the predictor vector based on the gradient. The SGD algorithm 220 may then execute a number of additional iterations by selecting further samples from the training data 222 and updating the predictor vector after each iteration. After completing a specified number of iterations, the SGD algorithm 220 returns the predictor vector to the SVM module 218. In some cases, the number of iterations may be predetermined and based on an estimated amount of time for the SGD algorithm 220 to execute the predetermined number of iterations and/or the computational resources to execute the predetermined number of iterations.

The memory 206 also includes a parallelization module 224 to parallelize computations of the SGD algorithm 220. For example, the computations of the SGD algorithm 220 may be distributed among a number of computing devices, such as the computing devices 202 and 212-216. In a particular implementation, the SGD algorithm 220 utilizes a distributed hash table 226 stored in the memory 206. The distributed hash table 226 may be produced by applying a hash function to a portion of the data samples of the training data 222. In some cases, the distributed hash table 226 and the distributed hash tables of the additional computing devices 212-216 may comprise a master hash table. Alternatively, or additionally, a master hash table may be stored in a particular one of the additional computing devices 212-216.

The SGD algorithm 220 may utilize the distributed hash table 226 to perform computations to determine a local predictor vector. For example, the SGD algorithm 220 determines a local predictor vector by determining a gradient for the primal SVM objective function for each entry of the distributed hash table 226. In turn, additional computing devices 212-216 may also determine a local value for the predictor vector. The parallelization module 224 facilitates the exchange of predictor vector information 228 including the local predictor vectors between the computing device 202 and the additional computing devices 212-216 to determine a global value for the predictor vector that is returned to the SVM module 218.

In addition, for each iteration of the SGD algorithm 220, the parallelization module 224 may determine whether the distributed hash table 226 is to be updated. The parallelization module 224 may facilitate the exchange of hash table information 228 between the computing device 202 and the additional computing devices 212-216 to update the distributed hash table 226 and/or to update the respective distributed hash tables of the additional computing devices 212-216. In a particular implementation, the parallelization module 224 may determine whether a particular training data sample is represented by an entry in the distributed hash table 226 and update the entry. In other cases, the parallelization module 224 may add a new entry to the distributed hash table 226, where the new entry is associated with the particular training data sample. For example, when the processor 204 is utilizing fewer resources than processors of the additional computing devices 212-216, then the parallelization module 224 may add a new entry to the distributed hash table 226 for the particular training data sample. Additionally, the parallelization module 224 may exchange the distributed hash table information 228 with the additional computing devices 212-216 to determine if updates have been made to the distributed hash tables of one or more of the additional computing devices 212-216 relating to the particular training data sample.

The memory 206 also includes a packing strategy module 230 to reduce communications between the computing device 202 and the additional computing devices 212-216 that calculate the predictor vector for the SVM module 218. In an illustrative implementation, the packing strategy module 230 may combine calculations of the SGD algorithm 220 to compute a local value of the predictor vector before communicating the results of the calculations with the additional computing devices 212-216. For example, rather than exchanging predictor vector information 232 to determine a global predictor vector for each iteration of the SGD algorithm 220, the packing strategy module 230 may combine calculations for determining the local predictor vector for several iterations of the SGD algorithm 220 before communicating the predictor vector information 232 with the additional computing devices 212-216 to determine a global predictor vector.

In some instances, the packing strategy module 230 may pre-calculate intermediate values, such as the inner products and kernel functions, utilized by the SGD algorithm 220 to determine the local predictor vector for a number of iterations of the SGD algorithm 220. For example, the packing strategy module 230 may pre-calculate an inner product between a predictor vector and a kernel mapping function vector for a group of iterations of the SGD algorithm 220. In addition, the packing strategy module 230 may pre-calculate one or more kernel functions for each iteration of a group of iterations of the SGD algorithm 220.

FIGS. 3-6 show methods 300, 400, 500, and 600, respectively, to train a support vector machine with a parallelized stochastic gradient descent algorithm. The methods 300, 400, 500, and 600 are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 3:
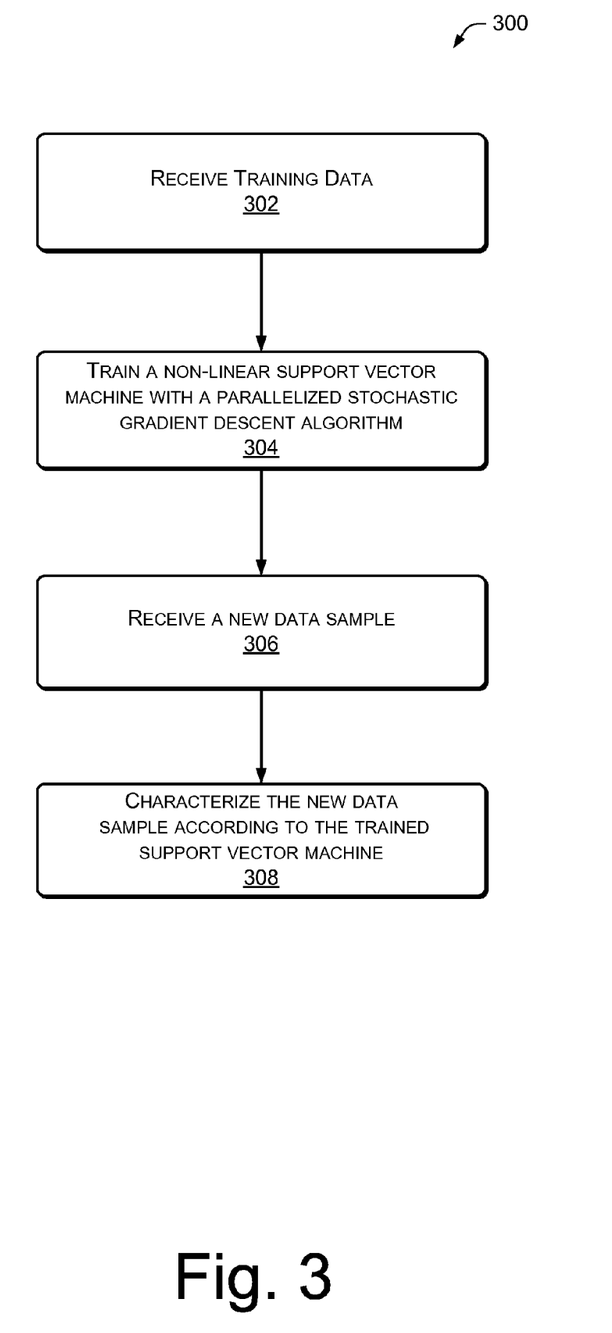
FIG. 3 is a flow diagram of a method to train a non-linear support vector machine with a parallelized stochastic gradient descent algorithm and to use the trained support vector machine to characterize a new data sample.

FIG. 3 illustrates a method 300 to train a non-linear support vector machine with a parallelized stochastic gradient descent algorithm and to use the trained support vector machine to characterize a new data sample. At 302, training data is received by a computing device executing a parallelized stochastic gradient descent algorithm to train a support vector machine. The computing device may include a number of processors. In some cases, the training data may include a number of samples with each sample including a feature vector. The feature vector specifies particular features of the sample. The training data samples may also include a classifier or a ranking that is associated with the respective feature vector of the sample.

At 304, the parallelized stochastic gradient descent algorithm trains a non-linear support vector machine. The parallelized stochastic gradient descent algorithm may be implemented by a number of processors residing on one or more computing devices. In particular, the calculations of the stochastic gradient descent algorithm may be distributed among the processors in order to reduce the amount of time to train the support vector machine. The parallelized stochastic gradient descent algorithm trains the non-linear support vector machine by providing parameters to the support vector machine, such as a predictor vector. The predictor vector can be used to solve a primal objective function of the support vector machine.

At 306, a new data sample is received at a computing device including the trained non-linear support vector machine. For example, the computing device may receive an email having a particular set of features, such as the sender of the email, a time that the email was sent, words or phrases in the body of the email, words or phrases of the subject line of the email, and so on. At 308, the computing device characterizes the new data sample according to the trained non-linear support vector machine. For example, the trained support vector machine may associate a feature vector of the new data sample with a particular classification or a particular ranking. In an illustrative example, the trained non-linear support vector machine may determine whether or not an email received by the computing device is spam or not based on the features of the email.

Figure 4:
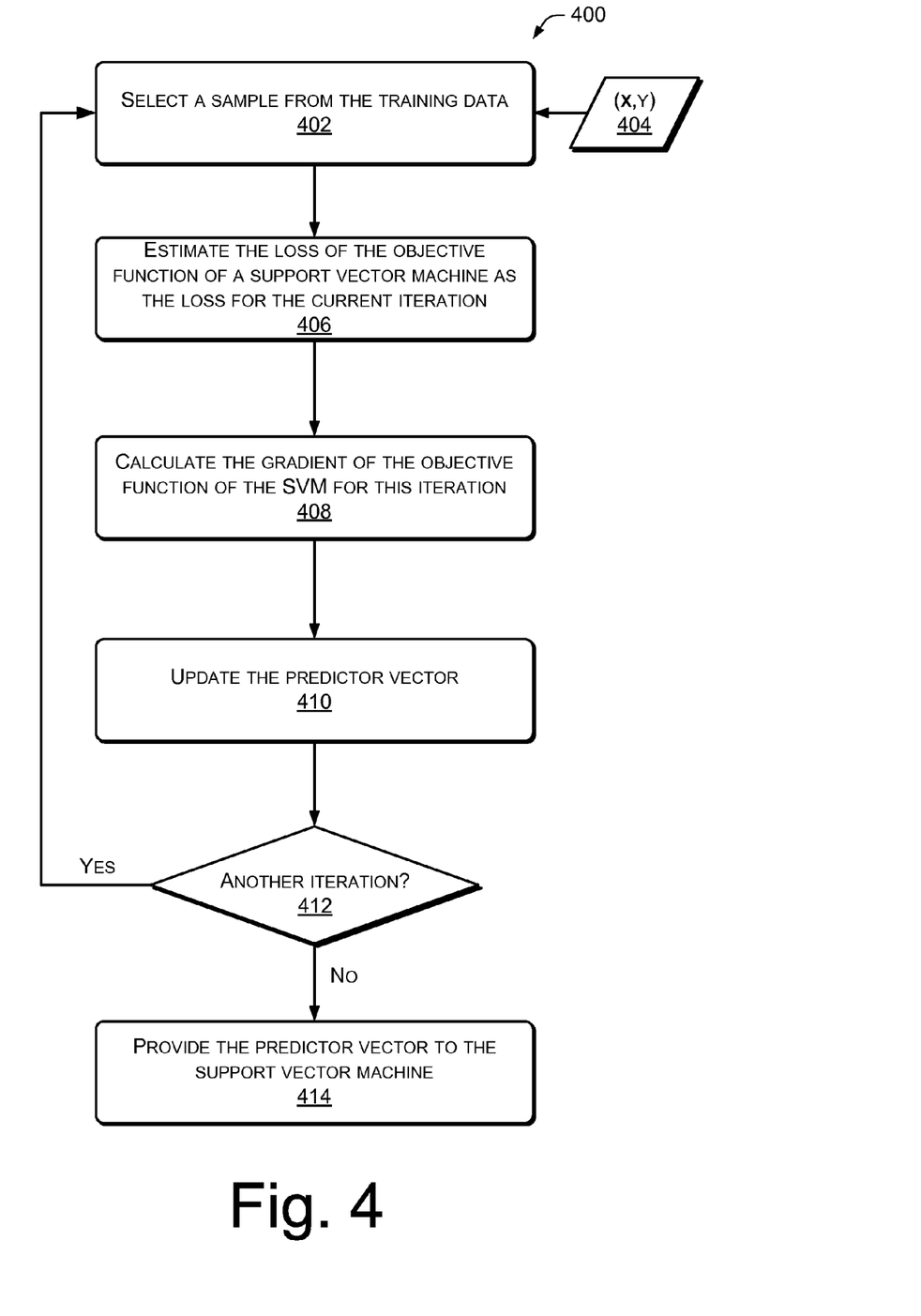
FIG. 4 is a flow diagram of a method to determine a predictor vector for the primal objective function of a support vector machine.

FIG. 4 illustrates a method 400 to determine a predictor vector for a primal objective function of a support vector machine. At 402, a sample 404 is selected from training data that is utilized to train the support vector machine. The training data sample 404 includes a feature vector x and a classifier value y. At 406, the loss of the objective function of the support vector machine is estimated as the loss for the current iteration. As mentioned previously, the loss of the SVM primal objective function, l(w), is given by:

$$\frac{1}{m}\sum_{i=1}^{m} \max\{0, 1 - y_i \langle w, \phi(x_i) \rangle\}, \quad (3)$$

where the expression $\langle w, \phi(x_i) \rangle$ is referred to herein as the inner product of the predictor vector w and the kernel mapping function vector $\phi(x_i)$. Thus, the overall loss for the primal objective function is estimated as:

$$l(w) \approx l_t(w) := \max\{0, 1 - y_{i(t)} \cdot \langle w, \phi(x_{i(t)}) \rangle\}. \quad (4)$$

Additionally, in this way, the overall primal objective function can be evaluated based on the primal objective function for this iteration, which is given by:

$$f(w) \approx f_t(w) := \frac{\sigma}{2}\|w\|_2^2 + l_t(w) \quad (5)$$

At 408, the gradient of the primal objective function for the particular iteration is calculated. In particular, the predictor vector for the primal objective function is given by:

$$w \leftarrow w - \frac{1}{\sigma t}\nabla f_t(w) \quad (6)$$

where $\nabla f_t(w)$ is the gradient of the primal objective function. The gradient of the primal objective function may be calculated by:

$$\nabla f_t(w) = \sigma w - \begin{cases} 0, & y_{i(t)} \cdot \langle w, \phi(x_{i(t)}) \rangle \geq 1 \\ y_{i(t)}\phi(x_{i(t)}), & y_{i(t)} \cdot \langle w, \phi(x_{i(t)}) \rangle < 1 \end{cases} \quad (7)$$

At 410, the predictor vector w is updated. In a particular implementation, when the support vector machine is non-linear and introduces kernels, the predictor vector can be evaluated as $$w = \sum_{i=1}^{m} \alpha_i y_i \phi(x_i),$$

such that w is given by:

$$w \leftarrow \left(1 - \frac{1}{t}\right)w + \begin{cases} 0, & y_{i(t)} \cdot \langle w, \phi(x_{i(t)}) \rangle \geq 1 \\ \frac{y_{i(t)}}{\sigma t} \cdot \phi(x_{i(t)}), & y_{i(t)} \cdot \langle w, \phi(x_{i(t)}) \rangle < 1 \end{cases} \quad (8)$$

After updating w according to equation 8, a projection is applied to help bring the primal objective function to a minimum. The projection is given by:

$$w \leftarrow \min\left\{1, \frac{1/\sqrt{\sigma}}{\|w\|_2}\right\}w \quad (9)$$

At 412, if another iteration is to be carried out, then the method 400 returns to 402. Otherwise, the method 400 moves to 414 and the predictor vector w is provided to the support vector machine. An example of instructions for performing the method 400 may be expressed as:

| | |
|---|---|
| 1. | INPUT: σ, T , training sample space Ψ |
| 2. | INITIALIZE: w = 0 |
| 3. | FOR t = 1, 2, . . . , T |
| 4. | Randomly pick up (x, y) ∈ Ψ |
| 5. | Predict y' ← ⟨w, φ(x)⟩ |
| 6. | w ← (1 − 1/t)w |
| 7. | IF yy' < 1 THEN $w \leftarrow w + \frac{y}{\sigma t}\phi(x)$ |
| 8. | $w \leftarrow \min\left\{1, \frac{1/\sqrt{\sigma}}{\|w\|_2}\right\}w$ |
| 9. | RETURN w |

In a particular implementation, the predictor vector may be expressed as w=sv where s∈ℝ is a scalar. By expressing w in terms of a scalar s and the vector v, when calculating w the scalar is changed rather than calculating each of the coefficients of the predictor vector. Thus, the term $$w \leftarrow w + \frac{y}{\sigma t}\phi(x_i)$$

of equation 8 can be expressed as $$v \leftarrow v + \frac{y}{\sigma t s}\phi(x_i).$$

In addition, a variable norm can be introduced to store an up-to-date value of $\|w\|_2$ for a hash table $\mathcal{H}$. The hash table $\mathcal{H}$ may be used to store key-value pairs designated as $(x_i, \beta_i)$, where $x_i$ represents a feature vector and $\beta_i$ is a value based on a hash function applied to the classifier value $y_i$. According to this particular implementation, an example of instructions for performing the method 400 may be expressed as:

```
1.   INPUT: σ, T, training sample space Ψ
2.   INITIALIZE: ℋ = 0, s = 1, norm = 0
3.   FOR t = 1, 2, . . . , T
4.       Randomly pick up (x, y) ∈ Ψ
5.       y' ← s⟨v, φ(x)⟩  by iterating all entries in ℋ
6.       s ← (1 − 1/t)s
7.       IF yy' < 1 THEN
8.
```
$$\text{norm} \leftarrow \text{norm} + \frac{2y}{\sigma t} \cdot y' + \left(\frac{y}{\sigma t}\right)^2 \mathcal{K}(x, x)$$

```
9.       IF key x is found in ℋ,
```
$$\text{THEN add its value by } \frac{y}{\sigma ts} \text{ in } \mathcal{H};$$

$$\text{ELSE add } \mathcal{H} \text{ a new entry } \left(x, \frac{y}{\sigma ts}\right)$$

```
10.      IF norm > 1/σ
```
$$\text{THEN } s \leftarrow s \cdot \frac{1}{\sqrt{\sigma \cdot \text{norm}}}; \text{norm} \leftarrow 1/\sigma$$

```
11.  RETURN sv by iterating all entries in ℋ
```

As indicated in the instructions above, when a hash table is used to calculate the predictor vector, a process can be used to update the hash table when calculating the gradient of the primal objective function. In particular, when the training data sample 404 includes a feature vector x that is included in the distributed hash table, then the value, $\beta_i$ associated with the feature vector is updated by $$\frac{y}{\sigma ts}.$$

When the feature vector is not included in the distributed hash table, then a new entry is added to the distributed hash table $$\left(x, \frac{y}{\sigma ts}\right).$$

Figure 5:
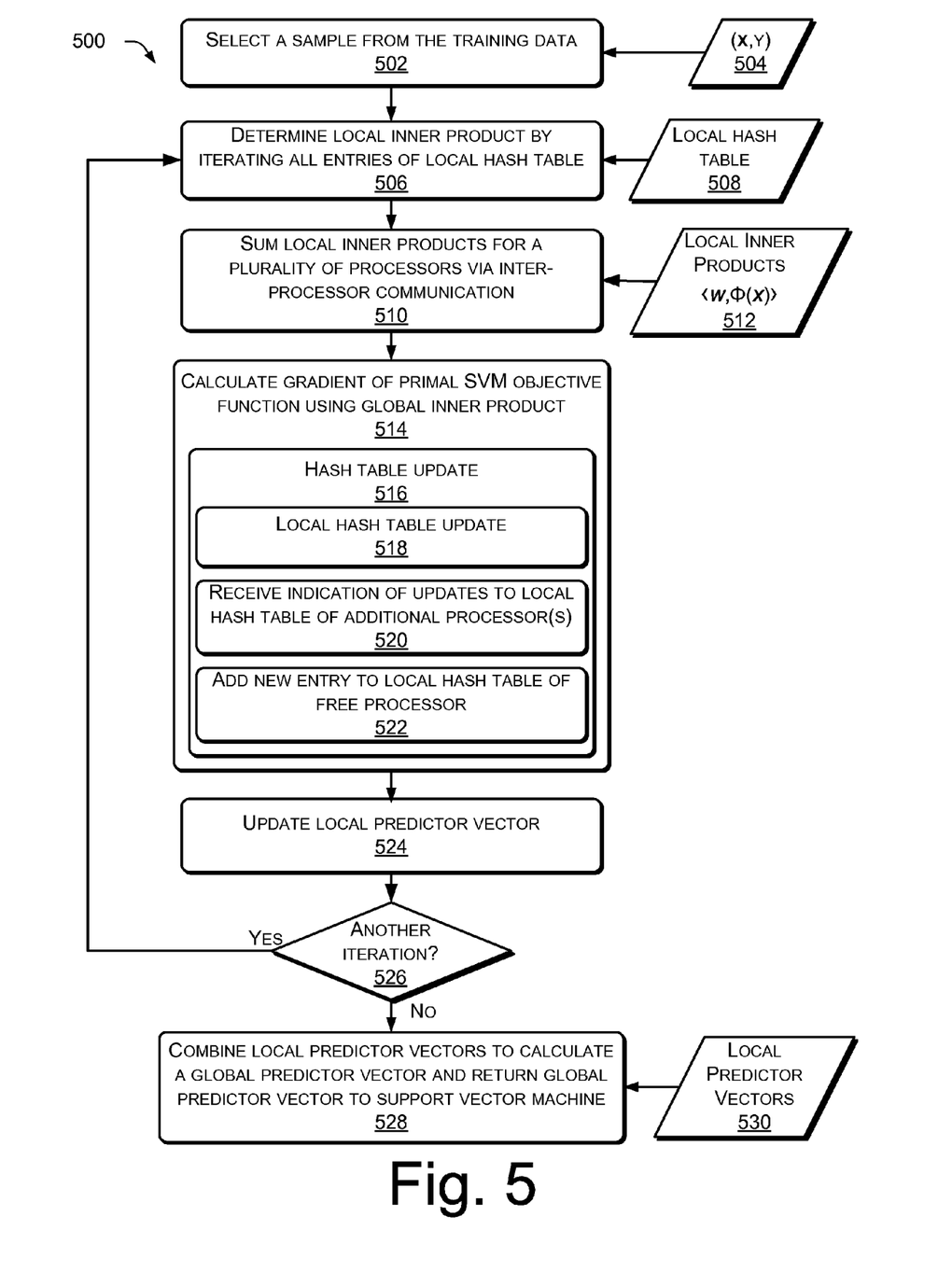
FIG. 5 is a flow diagram of a method to determine a predictor vector for the primal objective function of a support vector machine utilizing a hash table distributed among a plurality of processors.

FIG. 5 illustrates a method 500 to determine a predictor vector for an objective function of a support vector machine utilizing a hash table distributed among a plurality of processors. By distributing computation of the SGD algorithm among a plurality of processors, the training of an SVM via the SGD algorithm can proceed more quickly.

At 502, a processor selects a sample 504 from training data. The sample 504 includes a feature vector x and a classifier value y. In some cases, the same sample 504 is provided to each processor implementing the SGD algorithm. At 506, the processor calculates a local inner product of the current value of the predictor vector w and a kernel mapping function vector φ(x) by iterating each entry of a local distributed hash table 508. The local distributed hash table 508 may include a subset of entries of an master hash table given by $$\mathcal{H}_i = \{(x_{i,j}, \beta_{i,j})\}_{j=1}^{|\mathcal{H}_i|} \subset \mathcal{H} \quad (10)$$

Each processor executing the SGD algorithm may be provided with a local distributed hash table $\mathcal{H}_i$ that represents a particular subset of the master hash table $\mathcal{H}$.

At 510, the processor sums the local inner product calculated by the processor with local inner products 512 from one or more additional processors via inter-processor communication to determine a global inner product for the predictor vector and the mapping space feature vector. At 514, the processor utilizes the global inner product to determine the gradient of the primal objective function for this iteration. As part of determining the gradient of the primal objective function, a hash table update may occur at 516. In particular, the local distributed hash table 508 may be updated at 518 when the feature vector x from the training data sample 504 is included in the local distributed hash table 508. For example, a new value for the classifier y corresponding to the key x may be calculated at 516.

When the key x is not found in the local distributed hash table 508, then, at 520, the processor may receive an indication from an additional processor specifying that the local distributed hash table associated with the additional processor includes the key x. Thus, the local distributed hash table of the additional processor is updated. Further, when the key x is not included in the local distributed hash tables of any of the plurality of processors executing the stochastic gradient descent algorithm, a new entry may be added to one of the local hash tables at 522. For example, the local distributed hash table associated with the processor having the most free resources may be updated by adding a new entry based on the key x and the corresponding classifier value y.

At 524, a local predictor vector is updated based on the dot product of the classifier value y and the inner product of the current value of the predictor vector and the kernel mapping function vector. At 526, if there are further iterations, the method returns to 502, otherwise, the method moves to 528. At 528, the local predictor vectors 530 from each processor are combined to form a global predictor vector that is returned to the support vector machine. An example of instructions for performing the method 500 may be expressed as:

```
FOR PROCESSOR i
1.   INPUT: σ, T, training sample space Ψ
2.   INITIALIZE: ℋᵢ = 0, s = 1, norm = 0
3.   FOR t = 1, 2, . . . , T
4.       All processors pick up the same random (x, y) ∈ Ψ
5.       yᵢ' ← s⟨vᵢ, φ(x)⟩ by iterating all entries in ℋᵢ
6.       Sum up y' ← yᵢ' via inter-processor communication
7.       s ← (1 − 1/t)s
8.       IF yy' < 1 THEN
9.
```
$$\text{norm} \leftarrow \text{norm} + \frac{2y}{\sigma t} \cdot y' + \left(\frac{y}{\sigma t}\right)^2 \mathcal{K}(x, x)$$

```
10.      IF key x is found in ℋᵢ,
```
$$\text{THEN add its value by } \frac{y}{\sigma t}\Big/s \text{ in } \mathcal{H}_i;$$

```
11.      IF no processor reports the existence
         Find a least occupied processor j and add ℋⱼ
```
$$\text{a new entry } \left(x, \frac{y}{\sigma t}\Big/s\right)$$

```
12.      IF norm > 1/σ
```
$$\text{THEN } s \leftarrow s \cdot \frac{1}{\sqrt{\sigma \cdot \text{norm}}}; \text{norm} \leftarrow 1/\sigma$$

```
13.  RETURN sv by iterating all entries in ℋ₁, . . . Hₚ
```

Figure 6:
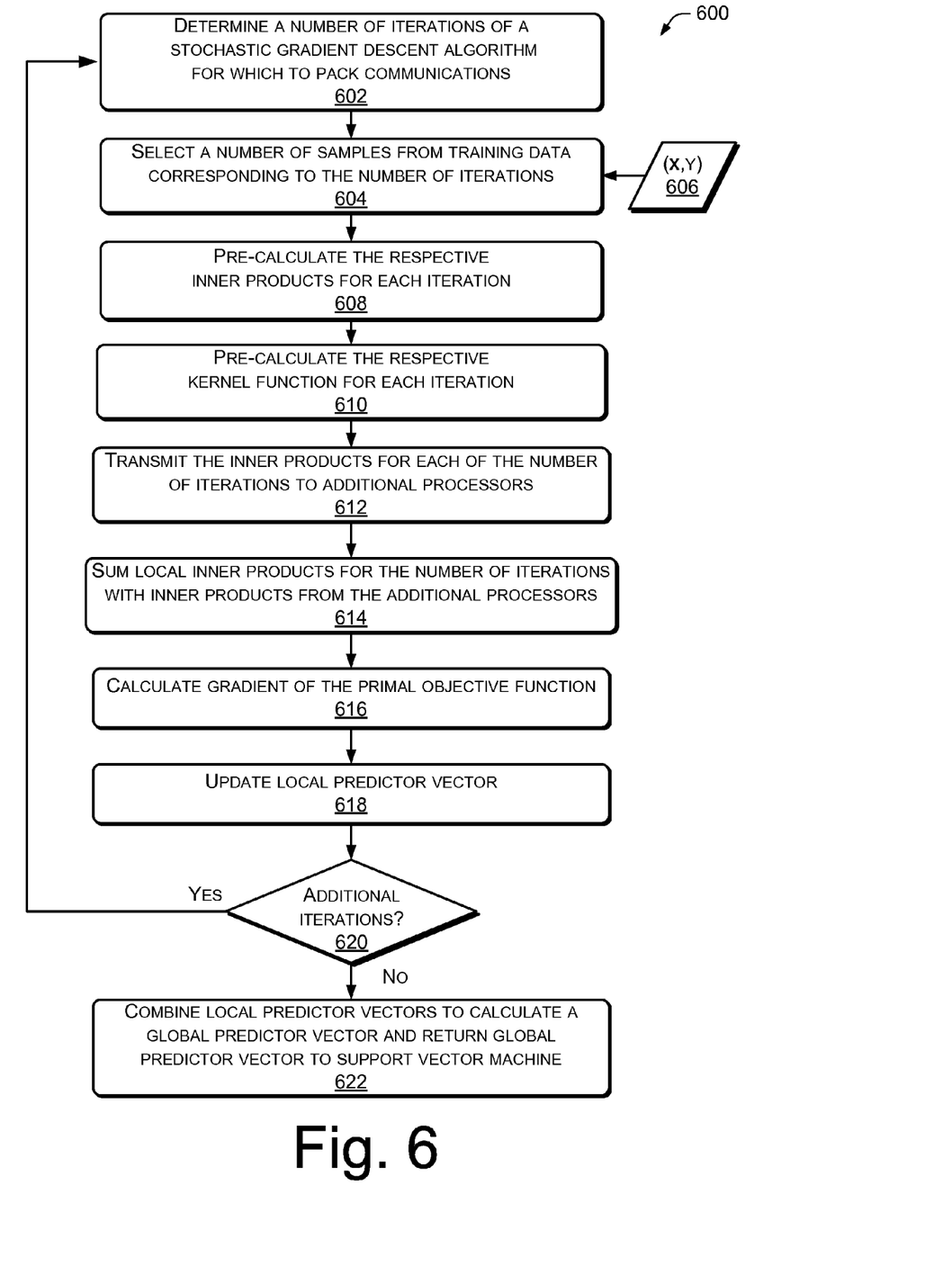
FIG. 6 is a flow diagram of a method to implement a packing strategy when determining a predictor vector for the primal objective function of a support vector machine via a parallelized stochastic gradient descent algorithm.

FIG. 6 illustrates a method 600 to implement a packing strategy when determining a predictor vector for a primal objective function of a support vector machine via a parallelized stochastic gradient descent algorithm. At 602, a number of iterations are determined for which to combine calculations of a stochastic gradient descent algorithm. For example, the stochastic gradient descent algorithm may reduce the number of communications between processors by combining results of the calculations of a number of iterations that is less than or equal to the total number of iterations before the processors exchange the results.

At 604, a number of data samples 606 from a training data set are selected corresponding to the number of iterations for which calculations are to be combined. For example, if calculations from 100 iterations are to be combined, then 100 data samples are chosen from the training data set. At 608, the inner product of the predictor vector w and the kernel mapping function vector $\phi(x)$ for each iteration in the number of iterations is pre-calculated. In some cases, the inner product for a subsequent iteration is calculated based on the inner product from one or more previous iterations. For example, the inner product for a third iteration may be pre-calculated based on the inner product of the second iteration, the inner product of the first iteration, or a combination thereof. In addition, at 610, at least one kernel function $\mathcal{K}(x, x)$ for each iteration is pre-calculated. The kernel function for a particular subsequent iteration may be based on kernel functions for one or more previous iterations. An example packing strategy may be illustrated as:

where ■ represent coefficients calculated for each iteration.

At 612, the inner products for each of the number of iterations are transmitted to a number of additional processors in one communication and the inner products from the processors executing the stochastic gradient descent algorithm are summed at 614. At 616, the gradient for the primal objective function is calculated for each of the number of iterations utilizing the pre-calculated inner products from 608. During the calculation of the gradient, an update of the local distributed hash table may take place for each iteration. In a particular implementation, the local distributed hash table update may take place according to a process including 516-522 of FIG. 5.

At 618, a local predictor vector is updated for each of the number of iterations based on the gradient calculated for each respective iteration. In conjunction with the illustrated packing strategy, the predictor vector for a particular iteration, $w_t$, can be calculated according to:

$$w_t = a_t w_{t-1} + b_t \phi(x_t) \quad (11)$$

where the coefficients $a_t$ and $b_t$ are represented in the packing strategy illustrated above as ■. At 620, if further iterations remain, the method returns to 602 such that calculations for a new group of iterations can be performed. At 622, when no iterations remain, the final local predictor vectors for each processor are combined to determine a global predictor vector that is returned to the support vector machine.

An example of instructions for performing the method 600 may be expressed as:

| PROCESSOR i |
|---|
| 1. INPUT: σ, T, r, training sample space $\Psi$ |
| 2. INITIALIZE: $\mathcal{H}_i = \emptyset$, s = 1, norm = 0 |
| 3. FOR t = 1, 2, ..., T/r |
| 4.    Randomly pick up r samples $(x_1, y_1) \ldots (x_r, y_r) \in \Psi$. Ensure all processors receive the same samples. |
| 5.    FOR k = 1, ... r Do |
| 6.       $y_{i,k}' \leftarrow s\langle v_k, \phi(x_i)\rangle$ by iterating all entries in $\mathcal{H}_i$ |
| 7.       Communicate with other processors to get $y_k' = \Sigma_i y_{i,k}'$ |
| 8.       Calculate $\text{pair}_{i,j} = \mathcal{K}(x_i, x_j)$ in distribution |
| 9.    LocalSet $\leftarrow \emptyset$ |
| 10.    FOR k = 1, ... r Do |
| 11.       s $\leftarrow$ (1 − 1/t)s |
| 12.       FOR l = k + 1 ... r Do $y_l' \leftarrow (1 − 1/t)y_l'$ |
| 13.       IF $y_k y_k' < 1$ THEN |
| 14.          $\text{norm} \leftarrow \text{norm} + \frac{2y_k}{\sigma t} \cdot y_k' + \left(\frac{y_k}{\sigma t}\right)^2 \text{pair}_{k,k}$ |
| 15.          $\text{LocalSet} \leftarrow \text{LocalSet} \cup \left\{\left(x_k, \frac{y_k}{\sigma t}\middle/ s\right)\right\}$ |
| 16.          For l = k + 1 ... r DO $y_l' \leftarrow y_l' + \frac{y_k}{\sigma t} \cdot \text{pair}_{k,l}$ |
| 17.       IF norm > 1/σ THEN |
| 18.          $s \leftarrow s \cdot \frac{1}{\sqrt{\sigma \cdot \text{norm}}}$; norm $\leftarrow 1/\sigma$ |
| 19.       FOR l = k + 1 ... r Do $y_l' \leftarrow (1 − 1/t)y_l'$ |
| 20.    Update $\mathcal{H}_i$ according to LocalSet, for those elements reported not existed in $\mathcal{H}_1 \ldots \mathcal{H}_p$, add them to the least occupied processors. |
| 21. |
| 22. RETURN $sv_i$ by iterating all entries in $\mathcal{H}_1, \ldots \mathcal{H}_p$ |

Although the coefficients $a_t$ and $b_t$ are calculated for each iteration and are not pre-calculated according to the packing strategy, pre-calculating the inner products $\langle w_t, \phi(x_t)\rangle$ and packing the inner products from a number of iterations into a single communication reduces the frequency of communications between processors during execution of the stochastic gradient descent algorithm. In addition, pre-calculating the Kernel functions $\mathcal{K}(x, x)$ for each iteration can save time when calculating the predictor vector for each iteration. In this way, the packing strategy reduces the amount of time to calculate the predictor vector for the support vector machine and processing resources utilized when calculating the predictor vector for each iteration are reduced.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   training, by at least one computing device including a plurality of processors, a non-linear support vector machine with a stochastic gradient descent algorithm using a training data set, wherein training the non-linear support vector machine includes executing the stochastic gradient descent algorithm for a number of iterations and wherein at least a portion of results of computations of a plurality of iterations of the number of iterations are combined prior to an exchange of results of the computations of the plurality of iterations by at least a subset of the plurality of processors; and parallelizing, by the at least one computing device, at least a portion of the computations of the stochastic gradient descent algorithm on the plurality of processors.

2. The method of claim 1, wherein training the non-linear support vector machine includes determining a predictor vector that minimizes a primal objective function of the non-linear support vector machine, the primal objective function of the non-linear support vector machine including a regularization portion and a loss portion.

3. The method of claim 1, wherein each iteration of the stochastic gradient descent algorithm includes:
selecting a random data sample from the training data set, the random data sample having a set of features;
calculating an inner product of the predictor vector and a kernel mapping function vector;
approximating a total value of the loss portion of the primal objective function based on a value of the loss portion for the random data sample;
calculating a gradient of the primal objective function; and
updating the predictor vector.

4. The method of claim 3, wherein a hash table is utilized to calculate the inner product for the predictor vector and the kernel mapping function vector.

5. The method of claim 4, wherein parallelizing at least a portion of the computations of the stochastic gradient descent algorithm includes distributing entries of the hash table to each of the plurality of processors.

6. The method of claim 1, wherein the number of iterations is predetermined.

7. The method of claim 1, further comprising:
receiving a new data sample after the non-linear support vector machine has been trained, the new data sample including a set of features; and
characterizing the new data sample according to the set of features of the new data sample.

8. The method of claim 7, wherein characterizing the new data sample includes at least one of: determining a classification for the new data sample, determining a ranking of the new data sample, or predicting an output corresponding to the new data sample.

9. The method of claim 1, wherein a first computing device includes a first portion of the plurality of processors and a second computing device includes a second portion of the plurality of processors.

10. One or more computer-readable storage memory including instructions that, when executed by a plurality of processors, perform acts comprising:
training, by the plurality of processors, a non-linear support vector machine with a stochastic gradient descent algorithm using a training data set, wherein training the non-linear support vector machine includes executing the stochastic gradient descent algorithm for a number of iterations and wherein at least a portion of results of computations of a plurality of iterations of the number of iterations are combined prior to an exchange of results of the computations of the plurality of iterations by at least a subset of the plurality of processors; and parallelizing, by the at least one computing device, at least a portion of the computations of the stochastic gradient descent algorithm on the plurality of processors.

11. The one or more computer-readable storage memory of claim 10, wherein training the non-linear support vector machine includes determining a predictor vector that minimizes a primal objective function of the non-linear support vector machine, the primal objective function of the non-linear support vector machine including a regularization portion and a loss portion.

12. The one or more computer-readable storage memory of claim 10, wherein each iteration of the stochastic gradient descent algorithm includes:
selecting a random data sample from the training data set, the random data sample having a set of features;
calculating an inner product of the predictor vector and a kernel mapping function vector;
approximating a total value of the loss portion of the primal objective function based on a value of the loss portion for the random data sample;
calculating a gradient of the primal objective function; and
updating the predictor vector.

13. The one or more computer-readable storage memory of claim 12, wherein a hash table is utilized to calculate the inner product for the predictor vector and the kernel mapping function vector.

14. The one or more computer-readable storage memory of claim 13, wherein parallelizing at least a portion of the computations of the stochastic gradient descent algorithm includes distributing entries of the hash table to each of the plurality of processors.

15. A computing system comprising:
a plurality of processors;
memory accessible by at least one of the plurality of processors, the memory storing instructions that, when executed by the plurality of processor, perform acts comprising:
training a non-linear support vector machine with a stochastic gradient descent algorithm using a training data set, wherein training the non-linear support vector machine includes executing the stochastic gradient descent algorithm for a number of iterations and wherein at least a portion of results of computations of a plurality of iterations of the number of iterations are combined prior to an exchange of results of the computations of the plurality of iterations by at least a subset of the plurality of processors; and parallelizing at least a portion of the computations of the stochastic gradient descent algorithm on the plurality of processors.

16. The computing system of claim 15, the acts further comprising:
receiving a new data sample after the non-linear support vector machine has been trained, the new data sample including a set of features; and
characterizing the new data sample according to the set of features of the new data sample.

17. The computing system of claim 16, wherein characterizing the new data sample includes at least one of: determining a classification for the new data sample, determining a ranking of the new data sample, or predicting an output corresponding to the new data sample.

18. The computing system of claim 15, wherein a first computing device includes a first portion of the plurality of processors and a second computing device includes a second portion of the plurality of processors.

* * * * *